M. MARKS.
NECK YOKE CENTER.
APPLICATION FILED NOV. 3, 1910.
992,020.
Patented May 9, 1911.
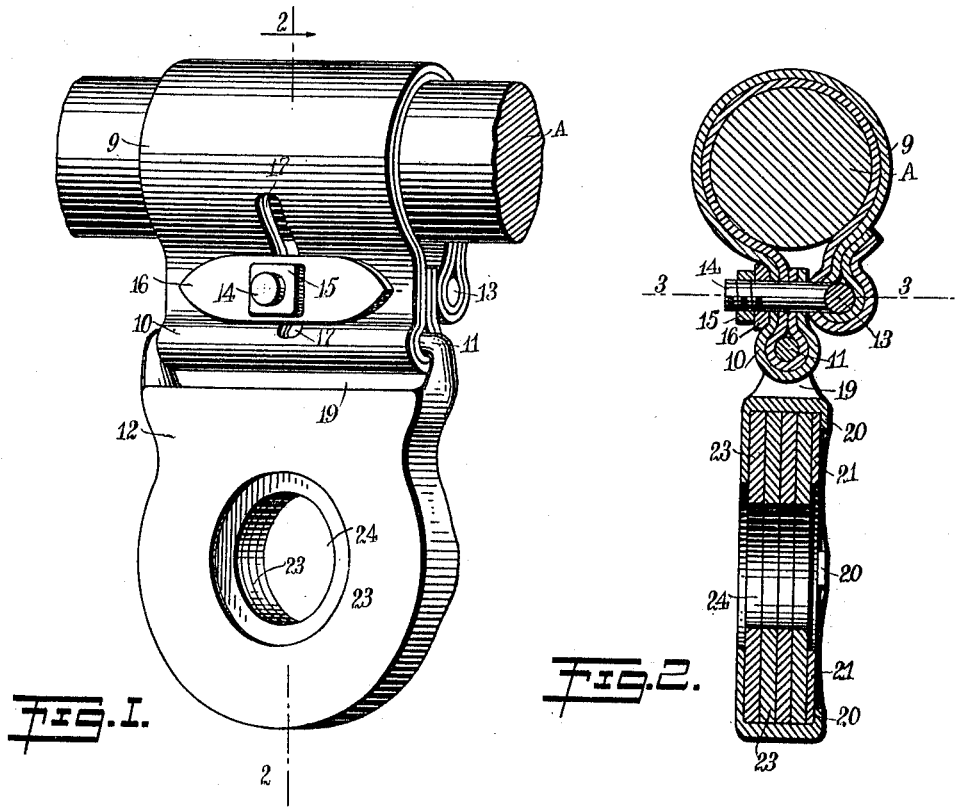
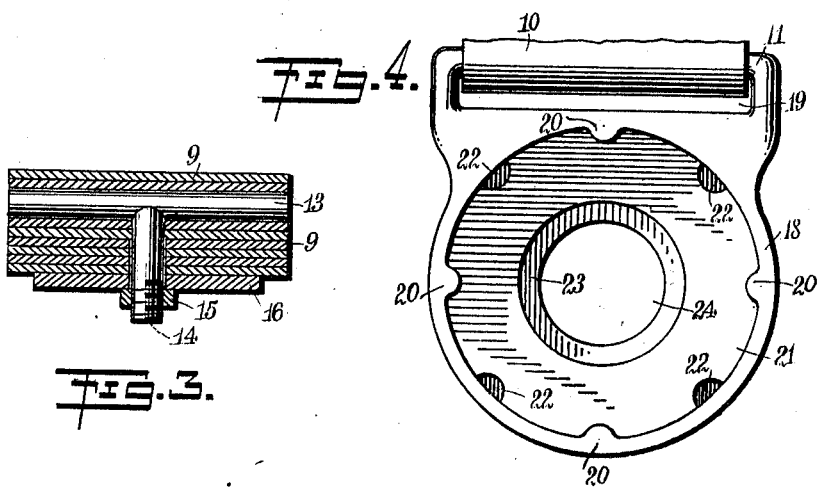
WITNESSES
G. Robert Thomas
INVENTOR
Mose Marks
BY
ATTORNEYS

UNITED STATES PATENT OFFICE.

MOSE MARKS, OF LEMON COVE, CALIFORNIA.

NECK-YOKE CENTER.

992,020.     Specification of Letters Patent.     Patented May 9, 1911.

Application filed November 3, 1910. Serial No. 590,548.

*To all whom it may concern:*

Be it known that I, MOSE MARKS, a citizen of the United States, and a resident of Lemon Cove, in the county of Tulare and State of California, have invented a new and Improved Neck-Yoke Center, of which the following is a full, clear, and exact description.

Among the principal objects which the present invention has in view are: to provide an eyelet constructed and arranged to obtain the maximum strength and minimum weight; to provide an eyelet constructed from pliable sound deadening material; to provide an eyelet so constructed that the anti-rattling material contained therein may be readily readjusted or replaced; to provide a loop for said eyelet, said loop being adjustable to contract or expand to accommodate neck yokes of different diameters; and to provide an eyelet and attaching loop therefor the construction whereof is simplified and economical.

One embodiment of the present invention is disclosed in the structure illustrated in the accompanying drawings, in which like characters of reference denote corresponding parts in all the views, and in which—

Figure 1 is a perspective view of a neck yoke having mounted thereon an eyelet and attaching loop constructed and arranged in accordance with the present invention; Fig. 2 is a vertical section taken on the line 2—2 in Fig. 1; Fig. 3 is a horizontal cross section of the attaching loop taken on the line 3—3 in Fig. 2; and Fig. 4 is a detail view of an eyelet constructed and arranged in accordance with the present invention, the view being taken from the reverse or rear side of the eyelet.

The hames bar A shown in the accompanying drawings may be of any usual and approved construction. It is preferred, however, that the usual thimbles or other devices for maintaining the eyelet loop centered thereon, are dispensed with. The centering of the loop and maintaining the same in position upon the yoke A is in the present instance provided for by contracting the loop 9 upon the said yoke A to firmly grip the same. The loop 9 is open ended. One end of the loop 9 is shaped to form a pivot fold 10, which is wrapped over a pivot bar 11 formed upon and offset from the body of the eyelet 12. The opposite end of the loop 9 is wrapped over and permanently secured about a cross bar 13. The bar 13 is provided with a shank extension 14, the outer end whereof is provided with a screw thread suitable to receive a nut 15. The nut 15 bears against a clamp plate 16. It is to receive the shank 14 of the bar 13 that the end of the loop 9 adjacent the fold 12 is provided with a slot 17. It is after the shank 14 is extended through the slot 17 that the clamp plate 16 is placed over the shank and the nut 15 is secured on the threaded section thereof. Before tightening the nut 15 the clamp plate 16 and loop 9 are contracted to immovably grip the yoke A. In this position the nut 15 is set up to draw the bar 13 and the clamp plate 16 toward each other, firmly binding in clamped relation the intervening plies of leather.

The eyelet 12, as above set forth, is pivotally secured by means of the bar 11 with the loop 9 and the fold 10 thereof. The eyelet 12 is formed from a metal member, constructed and arranged to form a circular box-like body, the side wall 18 whereof is integrally formed with the bar 11, which is separated from the body portion of the eyelet to form an elongated eyelet 19 through which the leather forming the fold 10 is extended. The side wall 18 is provided with a series of inwardly extended lugs 20, 20. The lugs 20, 20 are provided to hold a cover plate 21, which is forced into the box-like receptacle formed by the wall 18. To permit the cover 21 being thus inserted within the wall 18 the said cover is provided with a series of peripheral recesses 22. The recesses 22 are shaped and formed to a size adapted to pass the lugs 20 when registered therewith, and the said plate 21 is pressed within the chamber formed by the side wall 18 sufficiently far to extend below the plane of extension of the said lugs. Within the chamber formed by the wall 18, the face of the eyelet 12 and the cover 21, are disposed leather washers 23, 23. The washers 23, 23 have formed therein a central opening 24 adapted to receive snugly the end of a carriage pole or thimble usually provided thereon. The washers 23, 23 form the anti-rattling feature of the eyelet above referred to. When assembling the various parts to form the eyelet constructed by me provision is made that the expansion of the washers shall be such as to hold outward the plate 21 in close contact with the lugs 20 of the wall 18, thereby overcoming any tendency which the said plate might have to rotate until the openings 22 register with the lugs 20, and in which event the plate 21 might come away from its position and cause thereby some annoyance. It will be observed that the plate 21 is extended into the box-like receptacle from the rear. In the event of the said plate becoming loosened and passing out of the said receptacle it will be held on the pole on which the eyelet is mounted. It will be observed that when thus constructed, an eyelet of the character mentioned may be readily and easily adjusted upon an old neck yoke, or fitted to a new neck yoke, as and when desired. It will also be observed that the washers 23 may be replaced or changed to compensate for wear or to accommodate the adjustment of the eyelet to different poles.

Having thus described my invention, what I claim as new and desire to secure by Letters Patent is:—

1. A neck yoke center, comprising a metal frame having formed thereon an elongated cross bar and a plurality of inturned holding lugs; a cover for said frame having peripheral recesses adapted to pass said lugs to permit the same to extend over the body of said cover to hold the same within said frame, said cover and said frame having alined centrally disposed perforations; and a pliable filling for said frame, said filling having a central perforation of smaller diameter than the perforation in said frame and disposed concentrically therewith.

2. A neck yoke center, comprising a metal frame having formed thereon an elongated cross bar and a plurality of inturned holding lugs; a cover for said frame having peripheral recesses adapted to pass said lugs to permit the same to extend over the body of said cover to hold the same within said frame, said cover and said frame having alined centrally disposed perforations; a pliable filling for said frame, said filling having a central perforation of smaller diameter than the perforation in said frame and disposed concentrically therewith; a strap having formed at one end thereof a loop engaging said cross bar and at the other end thereof a loop to engage a clamping T-bar; and a T-bar having a centrally disposed screw threaded extension and a nut engaging said extension to clamp the ends of said strap upon the neck yoke.

3. A neck yoke center, comprising a metal frame having formed thereon an elongated cross bar and a plurality of inturned holding lugs; a cover for said frame having peripheral recesses adapted to pass said lugs to permit the same to extend over the body of said cover to hold the same within said frame, said cover and said frame having alined centrally disposed perforations; a pliable filling for said frame, said filling having a central perforation of smaller diameter than the perforation in said frame and disposed concentrically therewith; a strap having formed at one end thereof a loop to engage said cross bar and adjacent the said loop a longitudinally disposed slot; a T-bar fixedly secured to the opposite end of said strap, said bar having a screw threaded extension adapted to fit within said slot; a clamping plate slidably mounted on said extension; and a screw threaded nut for engaging the said screw threaded extension to clamp said T-bar and clamping plate upon the interposed strap.

In testimony whereof I have signed this specification in the presence of two subscribing witnesses.

MOSE MARKS.

Witnesses:
E. O. MILLER,
W. F. INGMUSON.

---

Copies of this patent may be obtained for five cents each, by addressing the "Commissioner of Patents, Washington, D. C."